April 5, 1927.

M. E. WALKER 1,623,141

MEAT GRINDER

Filed Nov. 25, 1925     2 Sheets-Sheet 1

INVENTOR.
Murphy E. Walker
BY
ATTORNEYS.

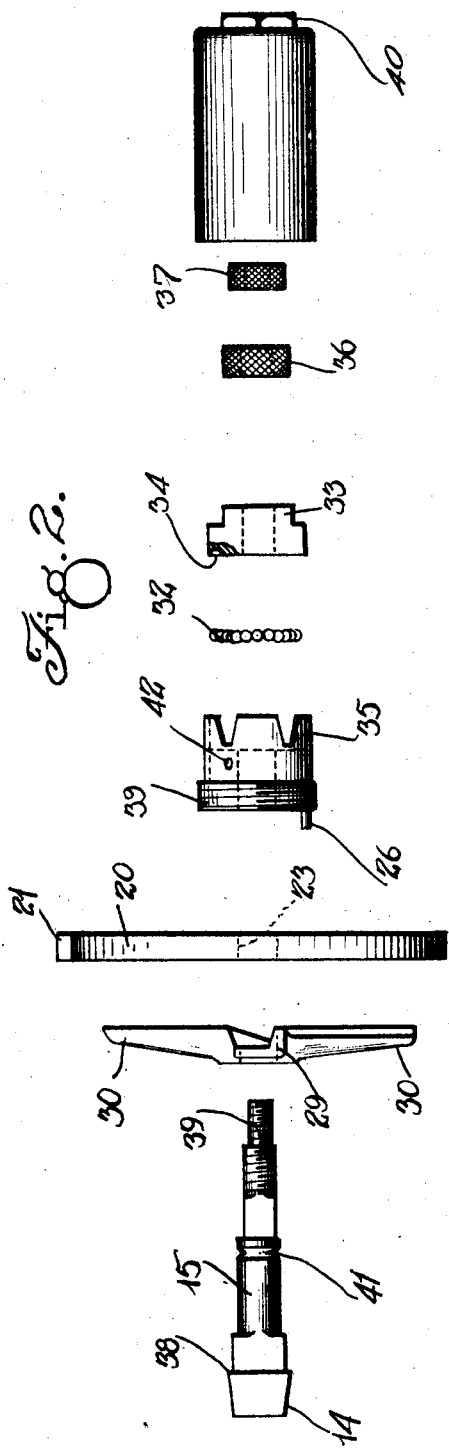

Patented Apr. 5, 1927.

1,623,141

UNITED STATES PATENT OFFICE.

MURPHY E. WALKER, OF AUSTIN, TEXAS.

MEAT GRINDER.

Application filed November 25, 1925. Serial No. 71,383.

This invention relates to vegetable and meat cutters of the screw feed type and more particularly to a meat cutter or grinder for use in cutting meat into relatively fine particles such as is used for sausage and the like and an object of the invention is to provide means for protecting the meat from being contaminated by deposits such as oil or the like on the working parts of the cutter.

It is a further object of this invention to provide a cutter which is detachable from the hopper or tube and the feed worm, novel means being provided for detachably connecting the cutting elements of the grinder to the driven parts of the said grinder, such as the worm feed, and it is furthermore an object of the invention to provide what may be termed cutting units which in their assembled state are removably applied to and secured in or on the hopper and tube.

It is a further object of this invention to provide the cutting or grinding units with ball bearings to reduce friction on the operating parts and to so shield or guard the ball bearing as to prevent the escape of meat should it reach the ball bearings, a condition which will obviate the commingling of such contaminated meat with the product passing from the grinder.

It is a further object of this invention to produce a grinding or cutting unit in which a perforated disk is employed, associated with knives which rotate on the surface of the disk for the purpose of severing meat passing through the perforations of the disk and it is furthermore an object to provide a disk which is reversible in order that knives may operate in conjunction with either side of the disk to prolong the usefulness of the disk.

It is a further object of this invention to provide novel means whereby the cutting assembly may be readily applied to and secured in place frictionally so that the friction is increased with the pressure and action during the grinding operation.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views and in which—

Figure 2 illustrates a view of the several elements of the assembly detached;

Figure 3 illustrates a view in elevation of the end of the assembly;

Figure 4 illustrates an enlarged detail view of the ball cup bearing; and

Figure 5 illustrates an enlarged detail view of the other bearing member.

Figure 1:
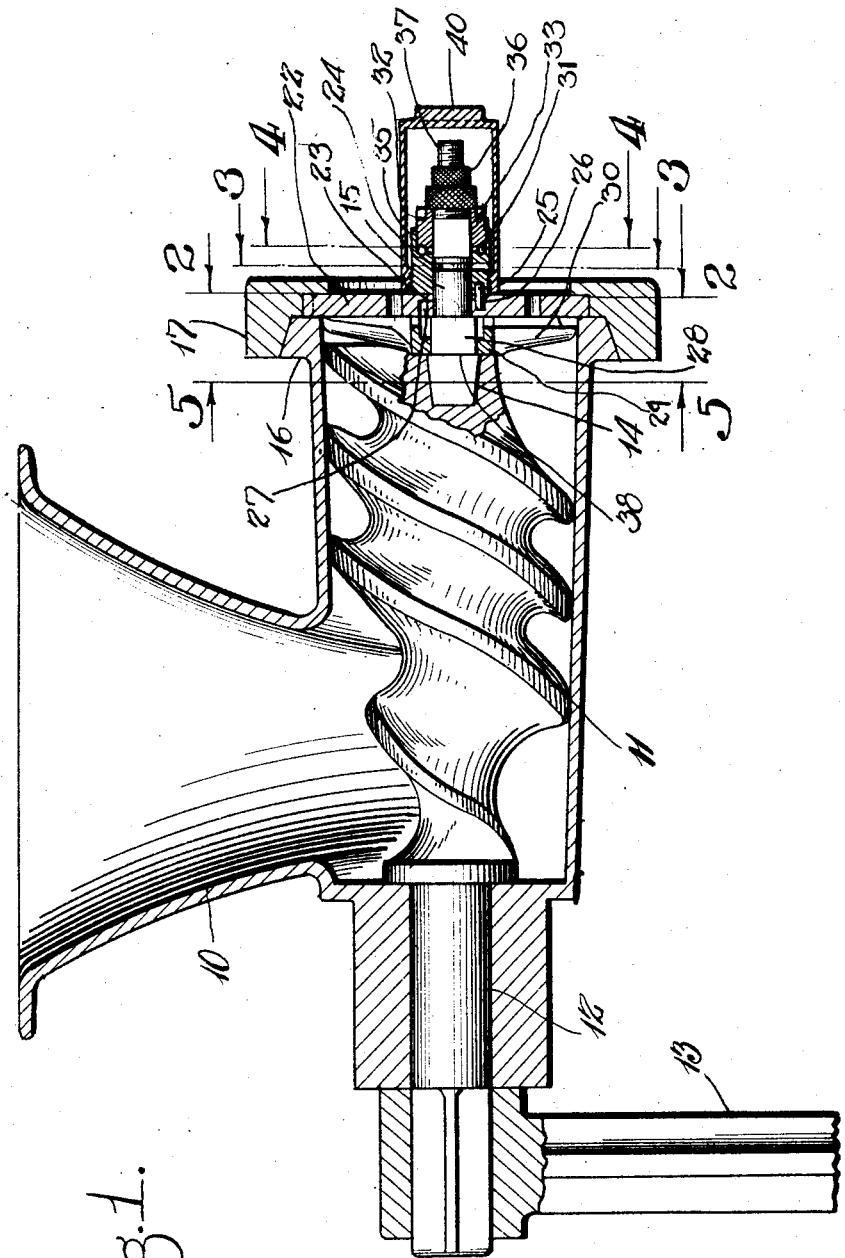
Figure 1 illustrates a sectional view of a grinder embodying the invention.

In these drawings 10 denotes a conventional type of grinder hopper and casing in which a screw 11 is rotatably mounted, the said screw having a trunnion 12 rotatable in one end of the structure, which trunnion may be rotated in any appropriate manner as by a crank 13 or it may, of course, be driven by power as those skilled in the art will understand.

The screw terminates within the housing and its end remote from the crank is provided with a socket 14 to receive an end of the shaft 15. The end of the shaft that fits in the socket is complemental to the configuration of the socket and projects therein in order that as the screw is rotated, rotary motion will be imparted to the shaft.

The outer end of the housing has an annular flange 16 whose periphery is tapered outwardly and it is intended to engage a ring 17 which, in the present embodiment of the invention constitutes a part of the cutting assembly to which reference has been made.

The flange 16 is provided with transversely disposed grooves or channels 18 which form clearances for inwardly extending lugs 19 that are carried by the ring, so that when the ring is applied to the flange the lugs are caused to register with the slot 18 and the ring is then forced on to the flange until the lugs pass beyond the inner edge of the flange 16. When the parts have assumed the positions just indicated, the ring is turned anti-clockwise and the inner surfaces of the lugs ride upon the inner surface of the flange 16 which inner surface is oppositely beveled from the recesses 18 in a manner to increase the frictional engagement of the lugs with the inner surfaces of the flanges. To the end just noted, the flange is gradually thickened transversely from one recess to the other.

The perforated cutting disk 20 has a peripheral lug 21 which fits in a recess 22 on the inner circumferential edge of the ring and the said perforated disk occupies a seat on the inner face of the ring which seat is of the same diameter as the disk so that the disk fits snugly in the seat with the lug 21 projecting into the recess 22, a condition which prevents the disk from turning independently of the ring or vice versa.

The shaft 15 extends through a central aperture 23 of the disk and through a bearing 24 that is anchored to the disk by means of a pin 25 which extends into an aperture 26 of the disk and the said disk also has another aperture 27 extending inwardly in its opposite face to receive the pin 25 when the disk is reversed for use of the opposite face of the disk.

The shaft 15 is angularly disposed in cross section as at 28 and the hub 29 of the knives 30 is mounted on the said angularly disposed portion of the shaft in order that the knives will be rotated with relation to the disk as the feed screw and shaft are rotated. The bearing has a race way 31 in its face in which balls or other anti-friction elements 32 are mounted and the bearing member 33 has a channel 34 in its face in which the balls are rotated as the grinder is operated. The bearing 24 has a flange 35 at its outer end into which the bearing member 33 is seated and the balls or anti-friction elements of the bearing are held in place by the bearing member 33 which bearing member is adjustably secured on the shaft by a jam-nut 36. After proper adjustment has been attained, a set nut 37 may be manipulated for retaining the parts in place. By the employment of the nut 36 the knives may be adjusted with relation to the disk 22 in order that the knives will bear on the disk with greater or less pressure according to the adjustment of the said nut, it being understood that there is a shoulder 38 at the junction of the shaft and its head which engages the hub of the knives so that through the axial movement of the shaft, the knives are adjusted with relation to the disk.

The external surface of the bearing member 24 is threaded as at 39 for engaging the threads of a cap 40 which cap encloses the outer end of the shaft and its bearings in order that meat may not escape through the joint between the shaft, the cutter disk and the shaft bearings and gain access to the product coming from the grinder.

As a means for insuring against the escape of meat which might pass through the joints between the working parts of the assembly, the shaft 15 is provided with a circumferential groove 41 and the bearing member 24 has a plurality of apertures 42 registering with the groove through which meat may escape to the interior of the cap 40.

From the foregoing description and the drawing, it will be seen that the inventor has produced what might be regarded as a meat cutting or grinding unit which includes the shaft which is removable from the feed worm and a ring detachable from the hopper structure, the said shaft and ring with the intermediate parts including the perforated plate, knives and bearings being capable of application to or removal from the other parts of the grinder. By reason of these conditions, grinding units in which the plates having apertures of different sizes can be employed and expeditiously changed for grinding and regrinding; or for grinding the meat to the proper fineness.

The stationary bearing element which is secured to the disk acts in conjunction, as will be understood by the rotary bearing element which turns with the shaft and which has means by which the movable bearing element and the shaft are connected together. Any suitable means may be provided for connecting them, but as here shown, the shaft is angular in cross section and the aperture in the rotatable bearing member is of complemental configuration.

I claim:

1. In a meat grinder, a cutting unit comprising a ring adapted to be anchored to a meat grinding machine, an apertured plate, a shaft rotatable therein and having means for connecting it to a meat feeding element of a grinder, a knife having a hub mounted on the shaft whereby the knife engages the apertured plate, the said shaft having a knife engaging part for holding the knife in engagement with the plate, a bearing anchored to the plate in which the shaft is rotatable, a coacting bearing on the shaft including means for adjusting the shaft and bearings, and a cap on the bearing enclosing the end of the shaft and the adjusting parts.

2. In a meat grinder, a cutting unit comprising a ring adapted to be anchored to a meat grinding machine, an apertured plate, a shaft rotatable therein and having means for connecting it to a meat feeding element of a grinder, a knife mounted on the shaft whereby the knife engages the apertured plate, the said shaft having a knife engaging part for holding the knife in engagement with the plate, a bearing member anchored on the plate through which the shaft extends and in which it rotates, a coacting bearing member mounted on the shaft and rotatable therewith, anti-friction elements between the bearing members, and means on the shaft for adjusting the bearing members and the knife.

3. In a meat grinder, a cutting unit comprising a ring adapted to be anchored to a meat grinding machine, an apertured plate, a shaft rotatable therein and having means for connecting it to a meat grinding element for rotation, a knife having a hub mounted on the shaft for rotation therewith, means for holding the knife in engagement with the plate, a bearing extending outwardly from the plate in which the shaft is rotatable, said bearing having a raceway in its end, a coacting bearing element on the shaft having a raceway in its end, anti-friction elements between the bearing members in the said raceway, and means for adjusting the shaft axially and for adjusting the bearing elements with relation to each other.

4. In a meat grinder, a cutting unit comprising a ring adapted to be anchored to a meat grinding machine, an apertured plate, a shaft rotatable therein and having means for connecting it to a meat grinding element for rotation, a knife having a hub mounted on the shaft for rotation therewith, means for holding the knife in engagement with the plate, a bearing extending outwardly from the plate in which the shaft is rotatable, said bearing having a raceway in its end, a coacting bearing element on the shaft having a raceway in its end, anti-friction elements between the bearing members in the said raceway, the said shaft and one of the bearing elements having meat discharging channels, and a meat collector stationary with relation to the bearing enclosing the said bearing.

MURPHY E. WALKER.